(12) United States Patent
Okamoto et al.

(10) Patent No.: US 7,073,092 B2
(45) Date of Patent: Jul. 4, 2006

(54) CHANNEL ADAPTER AND DISK ARRAY DEVICE

(75) Inventors: Homare Okamoto, Odawara (JP); Hidehiro Nagaya, Odawara (JP)

(73) Assignee: Hitachi, Ltd., Tokyo (JP)

(*) Notice: Subject to any disclaimer, the term of this patent is extended or adjusted under 35 U.S.C. 154(b) by 256 days.

(21) Appl. No.: 10/769,927

(22) Filed: Feb. 3, 2004

(65) Prior Publication Data

US 2005/0114574 A1 May 26, 2005

(30) Foreign Application Priority Data

Sep. 29, 2003 (JP) .............................. 2003-337239
Nov. 25, 2003 (JP) .............................. 2003-393647

(51) Int. Cl.
*G06F 11/00* (2006.01)
(52) U.S. Cl. ......................................... 714/18; 714/748
(58) Field of Classification Search ................. 714/18, 714/748

See application file for complete search history.

(56) References Cited

U.S. PATENT DOCUMENTS

| | | | | |
|---|---|---|---|---|
| 4,621,323 | A | * | 11/1986 | Mayhew ........................ 714/18 |
| RE33,181 | E | * | 3/1990 | Matsumura et al. .......... 714/49 |
| 5,477,552 | A | | 12/1995 | Nishiyama |
| 5,561,672 | A | | 10/1996 | Kaneko |
| 5,629,948 | A | * | 5/1997 | Hagiwara et al. ............ 714/748 |
| 5,896,394 | A | * | 4/1999 | Fukuda ........................ 714/712 |
| 5,905,854 | A | | 5/1999 | Nielson et al. |
| 6,028,892 | A | * | 2/2000 | Barabash et al. ........... 375/222 |
| 6,161,207 | A | | 12/2000 | Lockhart et al. |
| 6,671,832 | B1 | * | 12/2003 | Apisdorf ....................... 714/52 |
| 6,804,804 | B1 | * | 10/2004 | Gahan et al. ................ 714/748 |
| 2002/0156984 | A1 | | 10/2002 | Padovano |
| 2003/0009721 | A1 | | 1/2003 | Hsu et al. |

FOREIGN PATENT DOCUMENTS

| | | |
|---|---|---|
| DE | 695 29 728 T2 | 12/1995 |
| EP | 0 717 357 B1 | 6/1996 |
| JP | 57127357 * | 8/1982 |
| JP | 8-314822 | 11/1986 |
| JP | 5-143472 | 6/1993 |

* cited by examiner

*Primary Examiner*—Scott Baderman
*Assistant Examiner*—Gabriel L. Chu
(74) *Attorney, Agent, or Firm*—Mattingly, Stanger, Malur & Brundidge, P.C.

(57) ABSTRACT

It is an object of the invention to provide a channel adapter and a disk array device that can retransmit partial data via an IP network and which are configured to be able to conduct a data guarantee of the partial data. CHA transmit data to host computers. The CHA compute an input guarantee code when the CHA store the data from a cache memory to a local memory. The CHA generate an output guarantee code when the CHA read the data from the local memory and transmit the data to a port unit. In a case where retransmission of partial data is requested after the transmission of the data, the CHA transmit the partial data to the host computers. Thereafter, the CHA again compute the output guarantee code of the data and compare it with the previously computed input guarantee code. In a case where both codes match, it is guaranteed that data transmission has been conducted normally.

10 Claims, 7 Drawing Sheets

CHANNEL ADAPTER AND DISK ARRAY DEVICE

CROSS-REFERENCE TO RELATED APPLICATION

This application relates to and claims priority from Japanese Patent Application No. 2003-393647, filed on Nov. 25, 2003, the entire disclosure of which is incorporated herein by reference.

BACKGROUND OF THE INVENTION

1. Field of the Invention

The present invention relates to a disk array device and a channel adapter.

2. Description of the Related Art

A disk array device is a large-capacity storage control device where plural storage disks are disposed in an array and which is constructed on the basis of, for example, RAID (Redundant Array of Independent Inexpensive Disks). For example, hard disk devices and semiconductor memory devices are used as storage devices. A logical volume is formed on a physical storage region that each storage device provides. A host computer such as a business-use server issues a predetermined command, whereby the host computer can read data from the logical volumes and write data to the logical volumes.

A disk array device configuring part of a SAN (Storage Area Network) conducts data transfer in block units in accordance with a fibre channel protocol. A SAN according to a fibre channel is called an FC-SAN. In an FC-SAN, high-speed data transfer can be conducted using a fiber-optic cable or a metal cable. Also, by using a fibre channel switch, a fabric structure can be obtained, and numerous disk array devices and numerous host computers can be interconnected.

One viewpoint of improving the reliability of disk array devices is whether or not the transmission and reception of data can be accurately conducted. For this reason, technology such as an LRC (Longitudinal Redundancy Check), a CRC (Cyclic Redundancy Check) and an ECC (Error-Correcting Code) is used in disk array devices.

Technology that checks whether or not data reception between a channel unit, which conducts data communication with a host computer, and a disk interface control board, which conducts data communication with a magnetic disk, has been conducted accurately is also known (U.S. Pat. No. 5,561,672). In this technology, a data buffer and a parity check circuit are respectively disposed on three control boards: the disk interface control board, a channel interface control board and a channel unit. When data is transferred between the control boards, a parity check is respectively conducted by each control board of the sender and receiver, the storage content of the data buffer of the sender and the storage content of the data buffer of the receiver are compared, and it is determined whether or not the data has been properly transferred.

In a case where data is sent from a disk array device to a host computer in an FC (Fibre Channel)-SAN, the data is sent to the host computer as a frame including about 2 KB of block data. The frame of the fibre channel is disposed with information representing the start of the frame (SOF), frame header information, a data field, a CRC and information representing the end of the frame (EOF). 0 to 2112 bytes of data can be stored in the data field. One or more frames are sent from the disk array device to the host computer in response to a request from the host computer.

An FC-SAN is a network in which high-speed data transfer is possible and which is stable in comparison to an IP network. Thus, there is little potential for sent data to be lost during transmission and for unrecoverable errors to arise in the data received by the host computer. Due to these circumstances, an FC-SAN is configured to retransmit all sent data in a case where trouble has arisen in part of the sent data.

In recent years, broadband network systems based on TCP/IP (Transmission Control Protocol/Internet Protocol) such as the Internet and the Intranet have become widespread, and technology that improves the fusion between IP (Internet Protocol) networks and storage systems (disk array devices) has been proposed. An IP-based SAN is called an IP-SAN. Technology where an SCSI (Small Computer System Interface) command set is serialized as a TCP/IP packet and a disk array device is directly connected to an IP network is known as one mode of an IP-SAN. This technology is known as iSCSI (Internet SCSI) or SCSI over IP.

An IP network is a complex network configured from plural servers, routers and switches, and the bandwidth and degree of congestion are ever-changing. Packets sent from a sender to a receiver have no guarantee of arriving in the sent order and there are cases where all or some of the packets are lost during transmission. Thus, a TCP/IP network is configured to be able to request partial retransmission of only lost data in a case where some of the data of the series is lost or an error has occurred.

In a case where a disk array device is directly coupled to an IP network, the difference in the technical makeup between the protocol used outside the disk array device (TCP/IP) and the protocol used inside the disk array device (FC) becomes a problem. Namely, in a case where retransmission is requested by the host computer in regard to part of data inside a frame, the requested data itself can be sent but the fact that the partial data is the correct data cannot be guaranteed. In a fibre channel, because one CRC is disposed in regard to all frames, a data guarantee cannot be conducted in regard to data in a case where part of the data inside the frame is to be retransmitted.

SUMMARY OF THE INVENTION

The present invention was made in light of the above-described problems, and it is an object thereof to provide a disk array device and a channel adapter than can guarantee partial data in a case where a portion of data is sent to a upper-level device. It is another aspect of the invention to provide a disk array device and a channel adapter that can conduct a data guarantee even in a case where data of an amount smaller than the unit with which a guarantee code is associated is sent. Further objects of the invention will become apparent from the description of the embodiments discussed later.

In order to solve the aforementioned problems, a channel adapter according to the invention is a channel adapter that is used in a disk array device and controls data exchange with a upper-level device, with the channel adapter comprising an internal memory, a guarantee code computing unit, a communication unit and a control unit. The internal memory stores data from an external memory. The guarantee code computing unit computes an input guarantee code in regard to the data inputted to the internal memory and computes an output guarantee code in regard to the data read from the internal memory, with the guarantee codes being retainable in the guarantee code computing unit. The communication unit transmits the data read from the internal memory to the upper-level device. In a case where partial data of the data is to be retransmitted to the upper-level device, the control unit uses the communication unit to transmit the partial data to the upper-level device, compares the input guarantee code and the output guarantee code recalculated by the guarantee code computing unit in regard to the data, and determines that transmission of the data has been conducted normally in a case where both guarantee codes are in conformity.

The upper-level device is a computer that uses a disk array device via a communications network and is configured as a personal computer, a work station, a server machine, a mainframe computer or a portable information terminal. The internal memory is disposed inside the channel adapter and is, for example, a readable/writable semiconductor memory (RAM: Random Access Memory). The internal memory may also be a volatile memory or a nonvolatile memory. The external memory is a memory disposed outside of the channel adapter and may be, for example, a cache memory. Data read from the external memory in response to a request from the upper-level device is stored in the internal memory and transmitted from the internal memory to the upper-level device via the communication unit. The guarantee code computing unit computes and retains guarantee codes in a case where data is inputted to the internal memory (data writing) and a case where data is outputted from the internal memory (data reading).

In a case where data is transmitted to the upper-level device, the control unit compares the input guarantee code, which is computed when data is stored in the internal memory, with the output guarantee code, which is computed when data is read from the internal memory, whereby the control unit can determine whether or not normal data transmission has been conducted.

In a case where trouble (packet non-delivery or data failure) has arisen in part of the data transmitted to the upper-level device, the portion (partial data) of the transmitted data in which the trouble occurred is again transmitted to the upper-level device. In this case, the control unit first transmits the desired partial data to the upper-level device via the communication unit, thereafter recalculates the output guarantee code of all data stored in the internal memory, and computes this again-computed output guarantee code with the input guarantee code. In a case where both guarantee codes are in conformity, the control unit determines that normal partial data has been transmitted. Here, by "both guarantee codes being in conformity" is meant a status indicating that data is normal by a comparison of both guarantee codes, and includes a case where both guarantee codes match.

In this manner, the control unit can indirectly conduct a data guarantee of the partial data by first transmitting the requested partial data, thereafter again computing the output guarantee code in regard to all of the data including the partial data and then comparing the output guarantee code with the computed input guarantee code. Thus, even in a case using a guarantee code computing unit that computes an input guarantee code and an output guarantee code in regard to all data stored in one frame, a data guarantee of partial data can be conducted. Thus, this is effect in a case where data exchange between the channel adapter and the upper-level device is conducted in accordance with a TCP/IP protocol and data exchange between the channel adapter and the external memory is conducted in accordance with a fibre channel protocol.

It should be noted that the protocol between the channel adapter and the external memory is not limited to a fibre channel protocol. Also, the protocol between the channel adapter and the upper-level device is not limited to a TCP/IP protocol.

In a case where the partial data is to be retransmitted to the upper-level device, the control unit can (1) use the communication unit to transmit the partial data to the upper-level device, (2) read the data from the internal memory and dummy-transfers the data to the communication unit, (3) use the guarantee code computing unit to recalculate the output guarantee code in regard to the dummy-transferred data, (4) compare the recalculated output guarantee code with the input guarantee code calculated when the data is stored in the internal memory, and (5) notify the upper-level device that transmission of the partial data has been conducted normally in a case where the recalculated output guarantee code and the input guarantee code match and notify the upper-level device that transmission of the partial data has not been conducted normally in a case where the recalculated output guarantee code and the input guarantee code do not match.

In the case where the partial data is to be retransmitted, all of the data including the partial data is read from the internal memory and dummy-transmitted to the communication unit. Here, dummy transmission means transmitting, for form's sake, the data of the internal memory to the communication unit in order to compute the output guarantee code, and the data inputted to the communication unit is nullified without being transmitted to the upper-level device.

Alternatively, in the case where the partial data is to be retransmitted to the upper-level device, the control unit can (1) read partial data from the internal memory and transfers the partial data to the communication unit, to thereby transmit the partial data to the upper-level device, (2) use the guarantee code computing unit to compute a partial output guarantee code in regard to the partial data read from the internal memory, (3) confirm that the partial output guarantee code and the input guarantee code computed when the data is stored in the internal memory do not match, (4) read the data from the internal memory and dummy-transfers the data to the communication unit, (5) use the guarantee code computing unit to recalculate the output guarantee code in regard to the dummy-transferred data, (6) compare the recalculated output guarantee code with the input guarantee code calculated when the data is stored in the internal memory, and (7) notify the upper-level device that transmission of the partial data has been conducted normally in a case where the recalculated output guarantee code and the input guarantee code match and notify the upper-level device that transmission of the partial data has not been conducted normally in a case where the recalculated output guarantee code and the input guarantee code do not match.

In a case where normal data transmission is being conducted, the partial output guarantee code based on the partial data and the input guarantee code based on all of the data do not match. Thus, by comparing the partial output guarantee code with the input guarantee code, it is confirmed that the guarantee code computing unit is operating normally.

DESCRIPTION OF THE PREFERRED EMBODIMENTS

Figure 1:
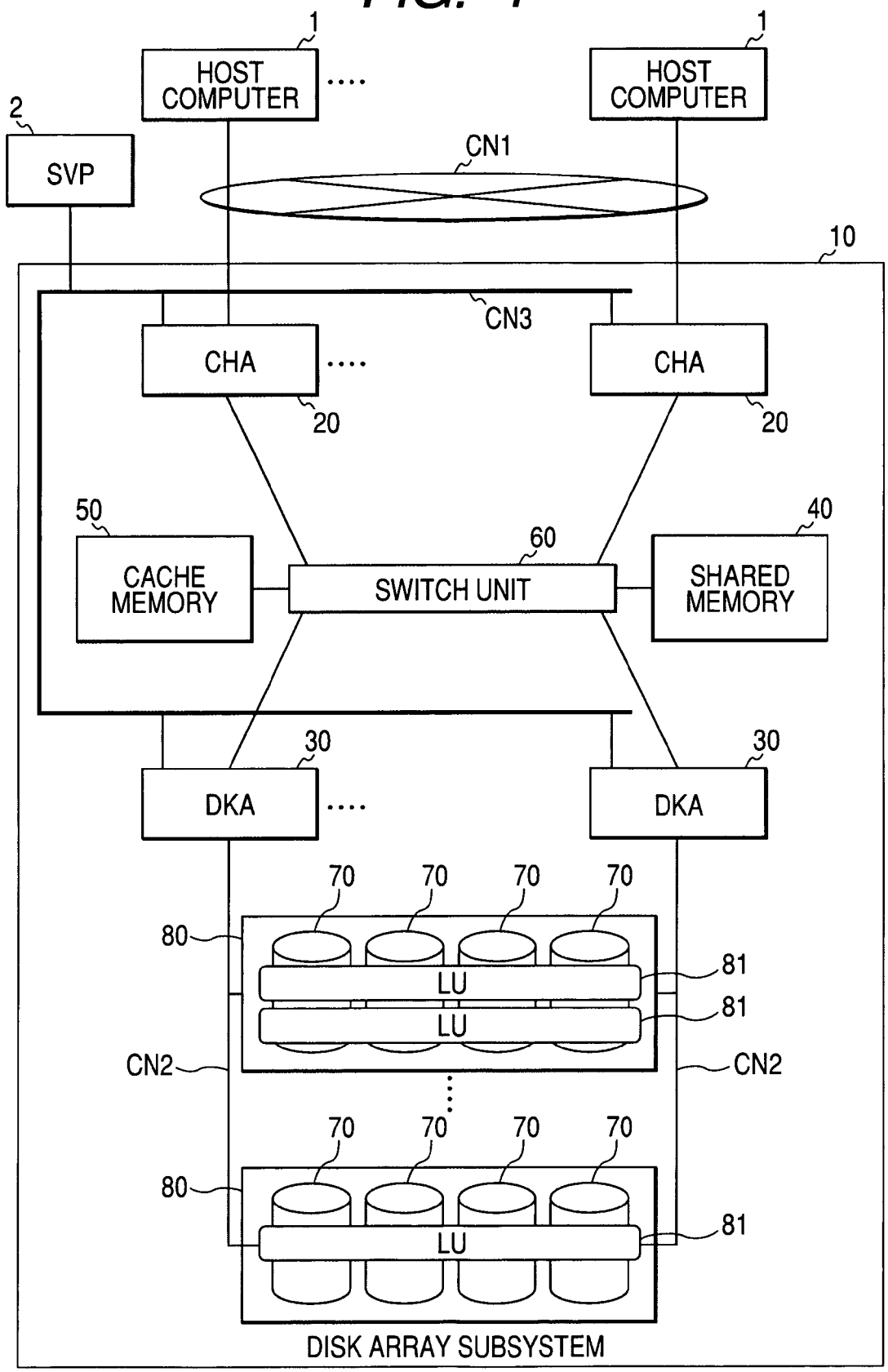
FIG. 1 is a block diagram showing the overall configuration of a disk array device pertaining to a first embodiment of the invention.

Embodiments of the invention will be described below on the basis of FIGS. 1 through 7.

In the embodiments, a method of controlling a channel adapter that is used in a disk array device and controls data exchange with a upper-level device is disclosed. The method comprising the steps of: in a case where partial data of data already transmitted to the upper-level device is to be retransmitted to the upper-level device, reading the partial data from an internal memory and transmitting the partial data to the upper-level device; comparing an output guarantee code computed in regard to all of the data with an input guarantee code computed when the data is inputted to the internal memory; and determining that transmission of the partial data has been conducted normally in a case where both guarantee codes match.

Another method of controlling a channel adapter is disclosed in the embodiments. This method comprises: a first step of storing data from an external memory in an internal memory; a second step of computing and retaining an input guarantee code in regard to all of the data when the data is inputted to the internal memory; a third step of reading the data from the internal memory; a fourth step of computing and retaining an output guarantee code in regard to all of the read data; a fifth step of transmitting the read data to the upper-level device; a sixth step of determining, and notifying the upper-level device, whether or not transmission has been conducted normally by comparing the input guarantee code and the output guarantee code; a seventh step of determining whether or not there is a retransmit request from the upper-level device in regard to partial data of the data sent to the upper-level device; an eighth step of reading the partial data from the internal memory and transmitting the partial data to the upper-level device in a case where there is a request to retransmit the partial data; a ninth step of rereading data stored in the internal memory; a tenth step of again computing an output guarantee code in regard to all of the reread data; and an eleventh step of determining, and notifying the upper-level device, whether or not transmission has been conducted normally by comparing the again-computed output guarantee code and the input guarantee code computed in the second step.

A disk array device is also disclosed in the embodiments. The disk array device comprises: a channel adapter that is connected to a upper-level device via a communications network and controls data exchange with the upper-level device; a storage device that stores data; a disk adapter that controls data exchange with the storage device; and a cache memory that stores data read from the storage device or data received from the upper-level device, wherein the channel adapter includes an internal memory that stores data from the cache memory, an input guarantee code computing unit that computes and retains an input guarantee code in regard to the data in a case where the data is stored in the internal memory, an output guarantee code computing unit that computes and retains an output guarantee code in regard to the data in a case where the data is read from the internal memory, a communication unit that transmits the data read from the internal memory to the upper-level device, and a control unit which, in a case where partial data of the data is to be retransmitted to the upper-level device, (1) uses the communication unit to transmit the partial data to the upper-level device, (2) uses the output guarantee code computing unit to recalculate the output guarantee code in regard to the data, and (3) compares the recalculated output guarantee code with the input guarantee code and determines that transmission of the data has been conducted normally in a case where both guarantee codes match.

First Embodiment

A first embodiment of the invention will be described on the basis of FIGS. 1 to 6. FIG. 1 is a block diagram showing the overall configuration of a disk array device 10. The disk array device 10 is disposed with channel adapters (abbreviated below as CHA) 20, disk adapters (abbreviated below as DKA) 30, a shared memory 40, a cache memory 50, a switch unit 60 and disk drives 70. The CHA 20 and DKA 30 are realized by the cooperation of a control program and a printed board disposed with a processor and a memory.

The disk array device 10 is connected to plural host computers 1 via a communications network CN1 so as that two-way communication is possible between the disk array device 10 and the host computers 1. Here, the communications network CN1 is a network that conducts two-way data communication in accordance with a TCP/IP protocol such as a LAN (Local Area Network) or the Internet. It should be noted that it is not necessary for all of the plural CHA 20 to conduct data transfer on the basis of TCP/IP. Some of the CHA 20 may conduct data transfer on the basis of a communications protocol such as SAN, FICON (Fibre Connection: registered trademark), ESCON (Enterprise System Connection: registered trademark), ACONARC (Advanced Connection Architecture: registered trademark) or FIBARC (Fibre Connection Architecture: registered trademark).

Each host computer 1 is a computer realized as a server, a personal computer, a work station, a mainframe computer or a portable information terminal. For example, each host computer 1 is connected via another communications network to plural client terminals positioned outside of the drawing. The host computers 1 read data from and write data to the disk array device 10 in response to a request from the client terminals, whereby services are provided to the client terminals.

The CHA 20 control data transmission with the host computers 1. Plural CHA 20 (e.g., 4 or 8) are disposed in the disk array device 10. The CHA 20 are prepared in accordance with the type of host computers 1, as in an open system-use CHA or a mainframe computer system-use CHA. In the present embodiment, at least one of the CHA 20 conducts data transfer on the basis of TCP/IP. As will be described together with FIG. 2 later, each CHA 20 is disposed with a port unit 210, a data transfer control unit 220, a processor 230 and a local memory 240.

The CHA 20 receive commands and data requesting the reading and writing of data from the host computers 1 to which they are connected, and operate in accordance with the commands received from the host computers 1. For example, when the CHA 20 receive a data read command from the host computers 1, the CHA 20 store the read command in the shared memory 40. The DKA 30 reference the shared memory 40 as needed. When the DKA 30 discover an unprocessed read command, the DKA 30 read data from the disk drives 70 and store the data in the cache memory 50. The CHA 20 read the data moved to the cache memory 50 and transmit, via the local memory 240, the data to the host computer 1 responsible for issuing the command. When the CHA 20 receive a data write request from the host computers 1, the CHA 20 store the write command in the shared memory 40 and store the received data in the cache memory 50. The DKA 30 store, in a predetermined disk drive 70 and in accordance with the command stored in the shared memory 40, the data stored in the cache memory 50.

The DKA 30 control data communication with the disk drives 70. Plural DKA 30 (e.g., 4 or 8) can be disposed inside the disk array device 10. The DKA 30 control data communication with the disk drives 70 and are respectively disposed with a processor unit, a data communication unit and a local memory (none of which is illustrated). The DKA 30 and the disk drives 70 are connected via a communications network CN2 such as a SAN and conduct data transmission in block units in accordance with the fibre channel protocol. The DKA 30 monitor as needed the statuses of the disk drives 70, and the monitoring results are sent to an SVP (Service Processor) 2 via an internal network CN3.

The disk drives 70 are realized as hard disk drives (HDD) or semiconductor memory devices. Here, one RAID group 80 can be configured by, for example, four disk drives 70. Each RAID group 80 is a disk group that realizes redundant storage of data in accordance with, for example, RAID 5 (not limited to RAID 5). At least one logical volume 81 (LU), which is a logical storage region, can be set on physical storage regions provided by the RAID groups 80. A user region that is accessed by the host computers 1 and a system region that is used in the storage of control information are set in the LU 81.

The shared memory 40 is configured by a nonvolatile memory and stores control information and management information. The cache memory 50 is an example of an "external memory" and stores mainly data.

The SVP 2 is a computer device for managing and monitoring the disk array device 10. The SVP 2 collects various types of environment information and attribute information from the CHA 20 and the DKA 30 via the communications network CN3 disposed inside the disk array device 10. Examples of the information that the SVP 2 collects include device configuration, power alarms, temperature alarms and input/output speed (IOPS). The communications network 3 is configured as a LAN. The system administrator can conduct setting of the RAID configuration and blockage processing of various types of packages (CHA, DKA, disk drives, etc.) via a user interface that the SVP 2 provides.

Figure 2:
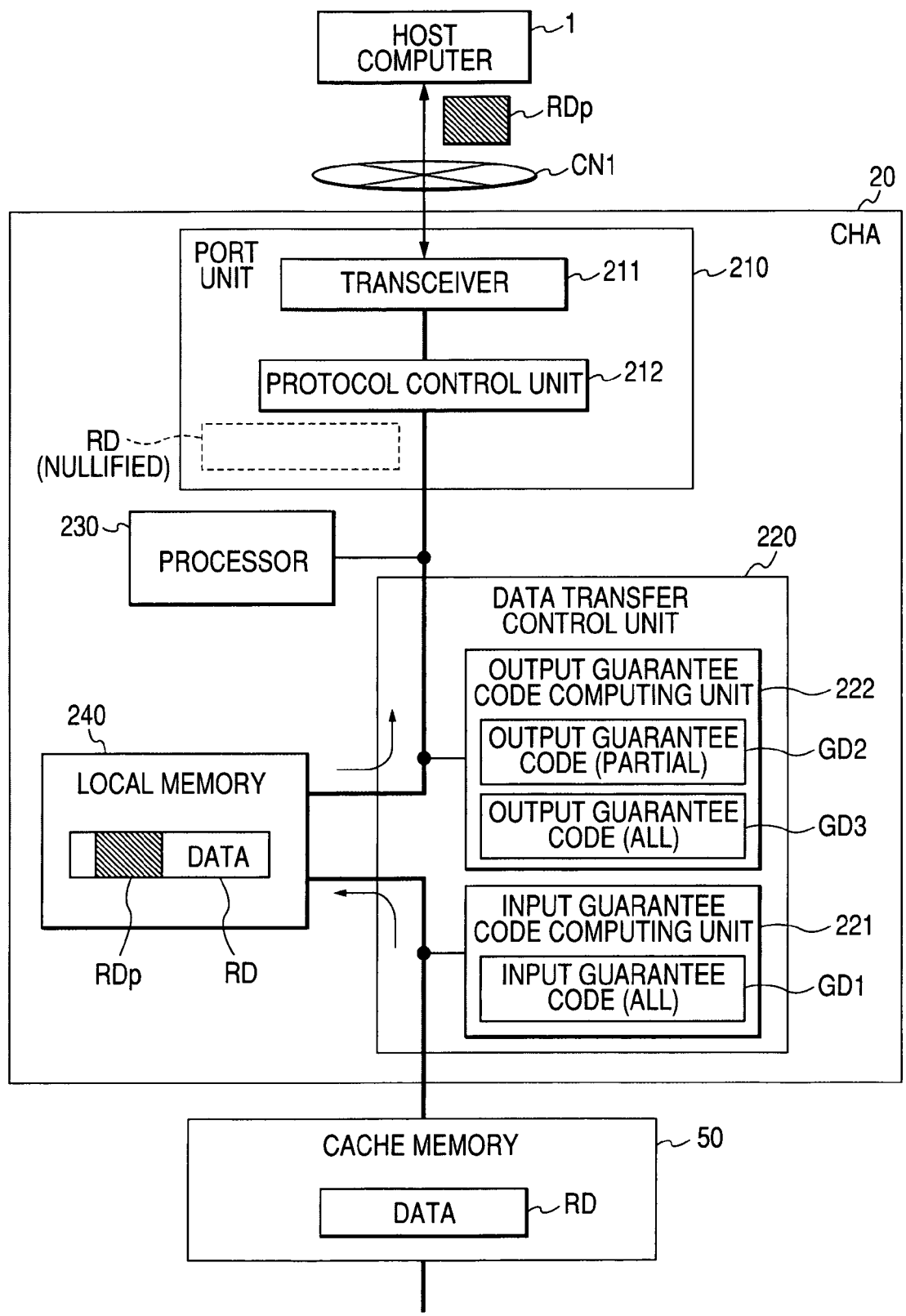
FIG. 2 is a block diagram showing the schematic configuration of a CHA.

FIG. 2 is a block diagram showing the schematic configuration of the CHA 20. The CHA 20 is disposed with the port unit 210, the data transmission control unit 220, the processor 230 and the local memory 240.

The port unit 210, which is an example of a "communication unit", is disposed with a transceiver 211 and a protocol control unit 212. The transceiver 211 conducts data communication with the host computers 1 via the communications network CN1 in accordance with a control command from the protocol control unit 212. The protocol control unit 212 controls the data transfer operation with the host computers 1 by controlling the operation of the transceiver 211 in response to the control command from the processor 230.

The data transfer control unit 220 respectively controls data transfer between the cache memory 50 and the local memory 240 and data transfer between the local memory 240 and the port unit 210. The data transfer control unit 220 controls data transfer between the cache memory 50 and the local memory 240 and data transfer between the port unit 210 and the local memory 240, without the intervention of the processor 230, by DMA (Direct Memory Access).

The data transfer control unit 220 is disposed with an input guarantee code computing unit 221 and an output guarantee code computing unit 222. The input guarantee code computing unit 221 and the output guarantee code computing unit 222 are examples of "guarantee code computing units". The input guarantee code computing unit 221 generates and retains a guarantee code (e.g., CRC, etc.) in regard to data inputted from the cache memory 50 to the local memory 240. The output guarantee code computing unit 222 generates and retains a guarantee code in regard to data outputted from the local memory 240 to the port unit 210. Although the guarantee code computing units 221 and 222 are respectively configured as hardware circuits, they are not limited thereto. All or some of the guarantee code computing functions may also be realized by a computer program.

An input guarantee code GD1 that the input guarantee code computing unit 221 computes is generated when data is inputted to the local memory 240. Output guarantee codes GD2 and GD3 that the output guarantee code computing unit 222 computes are generated when data is outputted from the local memory 240. Thus, the input guarantee code can be realized as an input guarantee code or data reading time guarantee code and the output guarantee codes can be realized as output guarantee codes or data reading time guarantee codes.

The processor 230 controls the entire operation of the CHA 20 and outputs appropriate control commands to the port unit 210 and the data transfer control unit 220. The processor 230 executes later-described processing in cooperation with the port unit 210 and the data transfer control unit 220.

The local memory 240 is disposed inside the CHA 20 and fulfills a function as a data buffer. In a case where the local memory 240 transmits data to the host computers 1, predetermined data is read from the cache memory 50 and stored in the local memory 240.

As shown in FIG. 2, when the host computers 1 request data RD, the DKA 30 read the requested data RD from the disk drives 70 and store the data in the cache memory 50. The data transfer control unit 220 reads the data RD stored in the cache memory 50 and transfers the data RD to the local memory 240. In this case, an input guarantee code in regard to the data RD is computed by the input guarantee code computing unit 221.

The data RD stored in the local memory 240 is read from the local memory 240 and transferred to the port unit 210 by the data transfer control unit 220. In this case, an output guarantee code in regard to the data RD is computed by the output guarantee code computing unit 222.

The data RD transferred to the port unit 210 is divided into packets in accordance with the TCP/IP protocol and sent to the host computers 1 from the transceiver 211. The input guarantee code and the output guarantee code are compared and, in a case where both guarantee codes match, it is possible to guarantee that the data sent to the host computers 1 is the requested data RD.

In a case where some kind of trouble has arisen in some of the data RD sent to the host computers 1, the host computers 1 request the transmission of partial data RDp that could not be normally received due to the trouble. In this case, the requested partial data RDp is read from the data RD stored in the local memory 240 and is retransmitted via the port unit 210.

Thereafter, all of the data RD stored in the local memory 240 is dummy-transferred to the port unit 210, and the output guarantee code of the data RD is again computed by the dummy transfer. The data RD that has been dummy-transferred to the port unit 210 is nullified without being sent to the outside. The again-computed output guarantee code and the input guarantee code computed when the data was stored in the local memory 240 are compared, whereby it is possible to (indirectly) guarantee whether or not the previously sent partial data RDp is normal data.

Figure 3A:
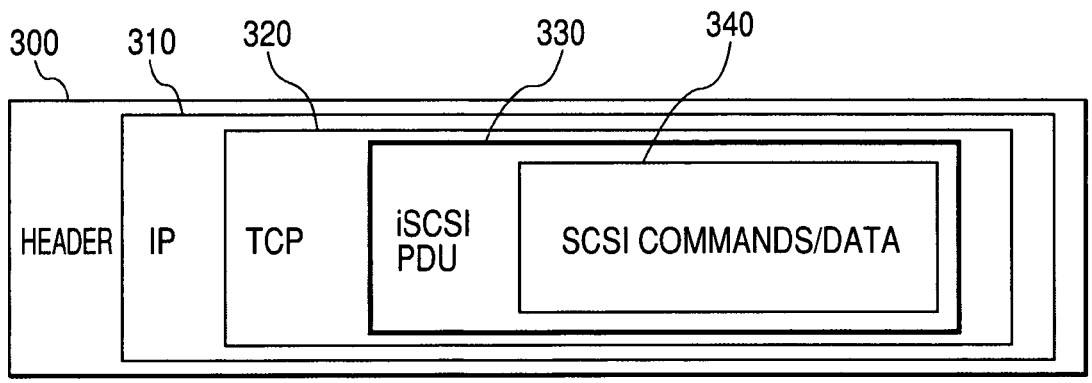
FIG. 3A is an explanatory diagram showing the frame structure of an iSCSI.
Figure 3B:
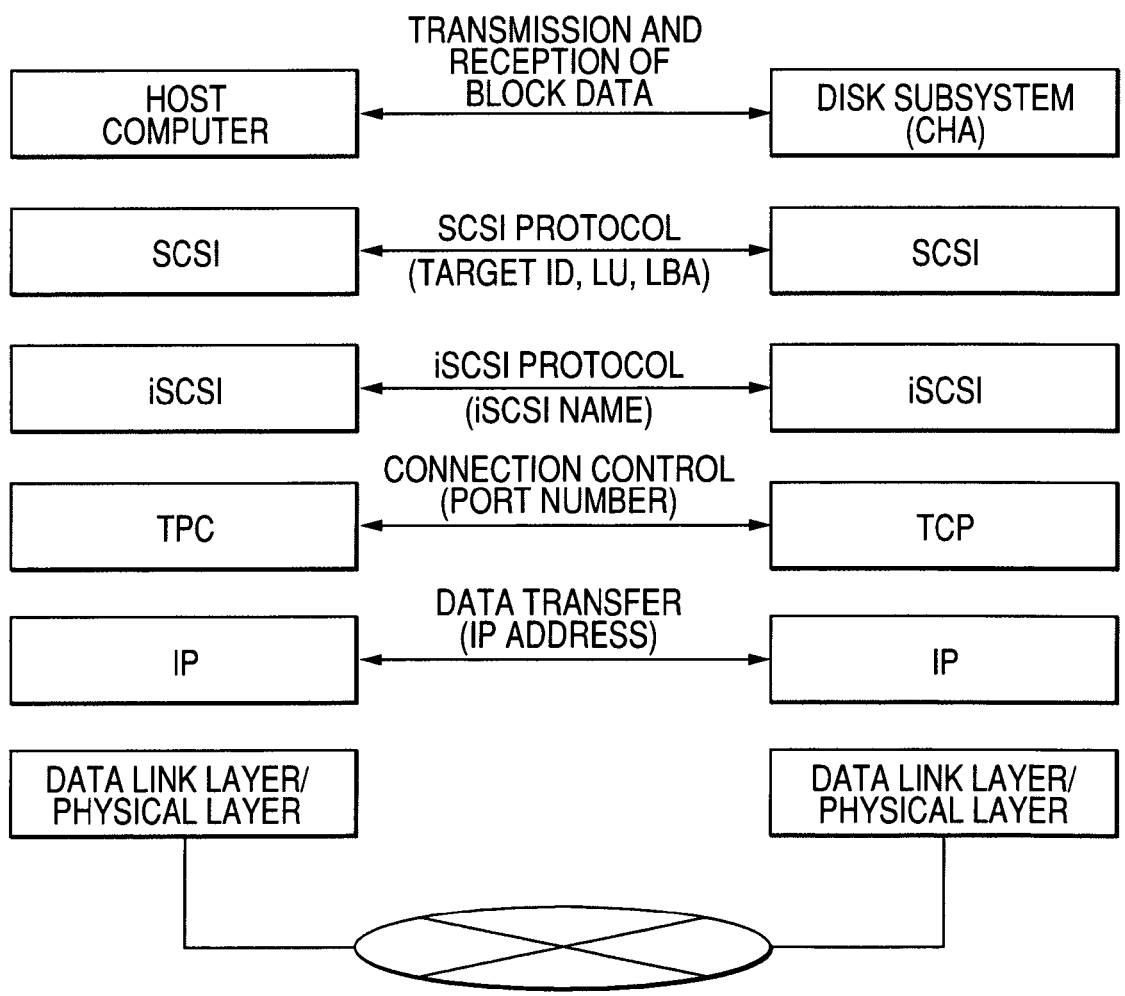
FIG. 3B is an explanatory diagram showing the hierarchical structure of the iSCSI.

FIGS. 3A and 3B are explanatory diagrams showing the configuration of data sent from the CHA 20 to the host computers 1. As shown in FIG. 3A, an iSCSI frame is disposed with a header 300 including a MAC (Media Access Control) address, an IP packet 310, a TCP packet 320 and an iSCSI PDU (Protocol Data Unit) 330. SCSI commands, data and SCSI responses are stored inside the PDU 330. Namely, by encapsulating the SCSI commands and data in the TCP packet, SCSI data can be sent and received via an IP network.

FIG. 3B is an explanatory diagram showing the hierarchical structure of the iSCSI protocol. Beginning in order from the bottom of the hierarchy, a data link layer/physical layer, an IP layer, a TCP layer, an iSCSI layer, an SCSI layer and an application layer are superposed. In the application layer (file system on the host computer and CHA), data transfer is conducted in block units. In the SCSI layer, data transmission and reception are conducted using SCSI commands. In the SCSI layer, addresses are identified by a target ID, an LU number and an LBA (Logical Block Address). In the iSCSI layer, addresses are identified by iSCSI names. In the TCP layer, port numbers are used, and in the IP layer, IP addresses are used. The iSCSI layer is positioned between the SCSI layer and the TCP layer, encapsulates data received form the SCSI layer, and generates the iSCSI PDU 330 and delivers the iSCSI PDU 330 to the TCP layer. Also, the iSCSI layer extracts SCSI commands and data from the iSCSI PDU 330 received from the TCP layer and delivers these to the SCSI layer.

Figure 4:
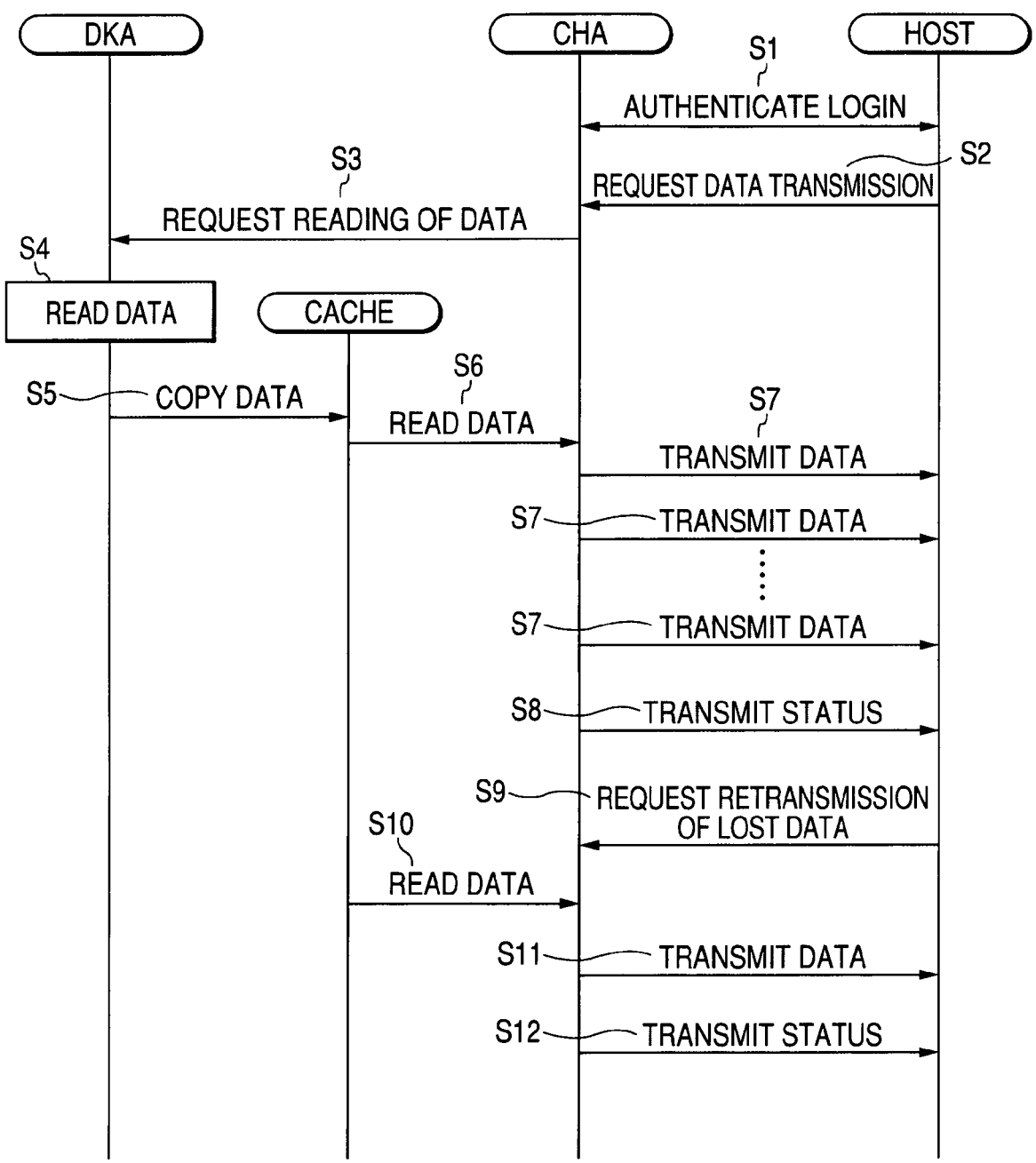
FIG. 4 is a flow chart showing the outline of the overall operation of the disk array device.

FIG. 4 is a flow chart showing the outline of the overall operation of the disk array device. First, the host computers 1 log into the CHA 20 and conduct login authentication (S1). Next, the host computers 1 request data transmission with respect to the CHA 20 by transmitting a read command (S2). When the CHA 20 receive the request from the host computers 1, the CHA 20 request data reading with respect to the DKA 30 by storing the read command in the shared memory 40 (S3).

The DKA 30 read the data from the disk drives 70 (S4) and store the data in the cache memory 50 (S5). The CHA 20 read the data stored in the cache memory 50 (S6) and transmit the data to the host computers 1 (S7). When data transmission to the host computers 1 is completed, the CHA 20 notify the host computers 1 of a normal status representing that data transmission has been normally conducted (S8).

It should be noted that, in a case where the requested data has already been stored in the cache memory 50, the data inside the cache memory 50 is read to the CHA 20. Specifically, when the port unit 210 receives the iSCSI command frame requesting data reading, this command is inputted to the processor 230 and the command content is interpreted by the processor 230. The processor 230 secures a cache region necessary for data transmission in the cache memory 50 and instructs the data transfer control unit 220 to read the data.

Even in a case where data transmission from the CHA 20 has been normally conducted, there are cases where the host computers 1 cannot read some of the data. For example, in cases where the network is congested or the processing burden of the host computers 1 is large, sometimes some of the packets are lost during transmission or the data is garbled. In such a case, the host computers 1 request the CHA 20 to retransmit the data that could not be read normally.

When the CHA 20 receive the partial data retransmit request, the CHA 20 read the data remaining in the cache memory 50 (S10) and retransmit only the requested partial data to the host computers 1 (S11). It should be noted that, in a case where data remains inside the local memory 240, the CHA 20 can also read the partial data from the local memory 240 and retransmit that data to the host computers 1. When the CHA 20 finish transmitting the partial data, the CHA 20 determine whether or not data transmission has been conducted normally and transmit a normal status or an abnormal status to the host computers 1 (S12).

Figure 5:
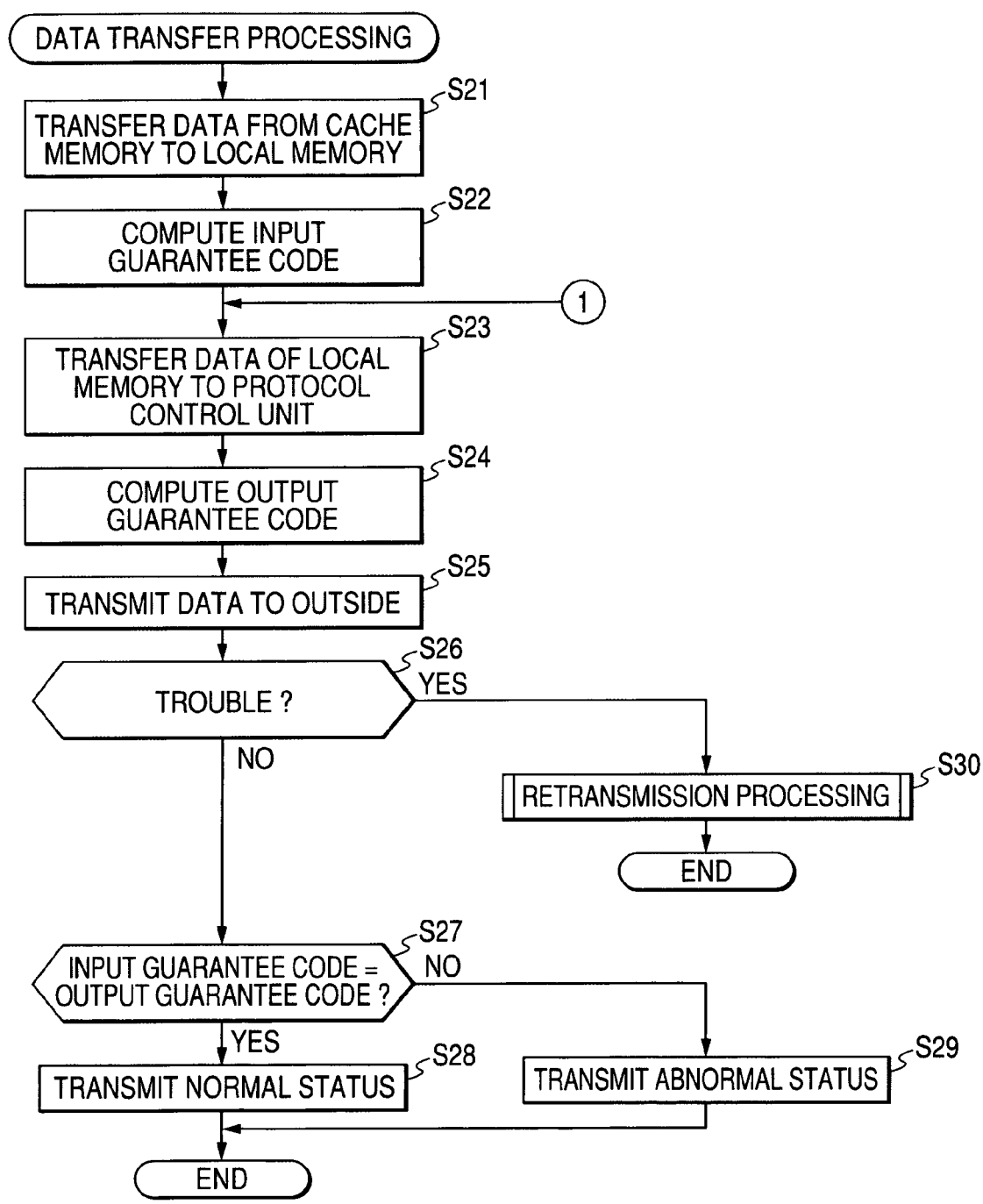
FIG. 5 is a flow chart showing the outline of data transfer processing by the CHA.
Figure 6:
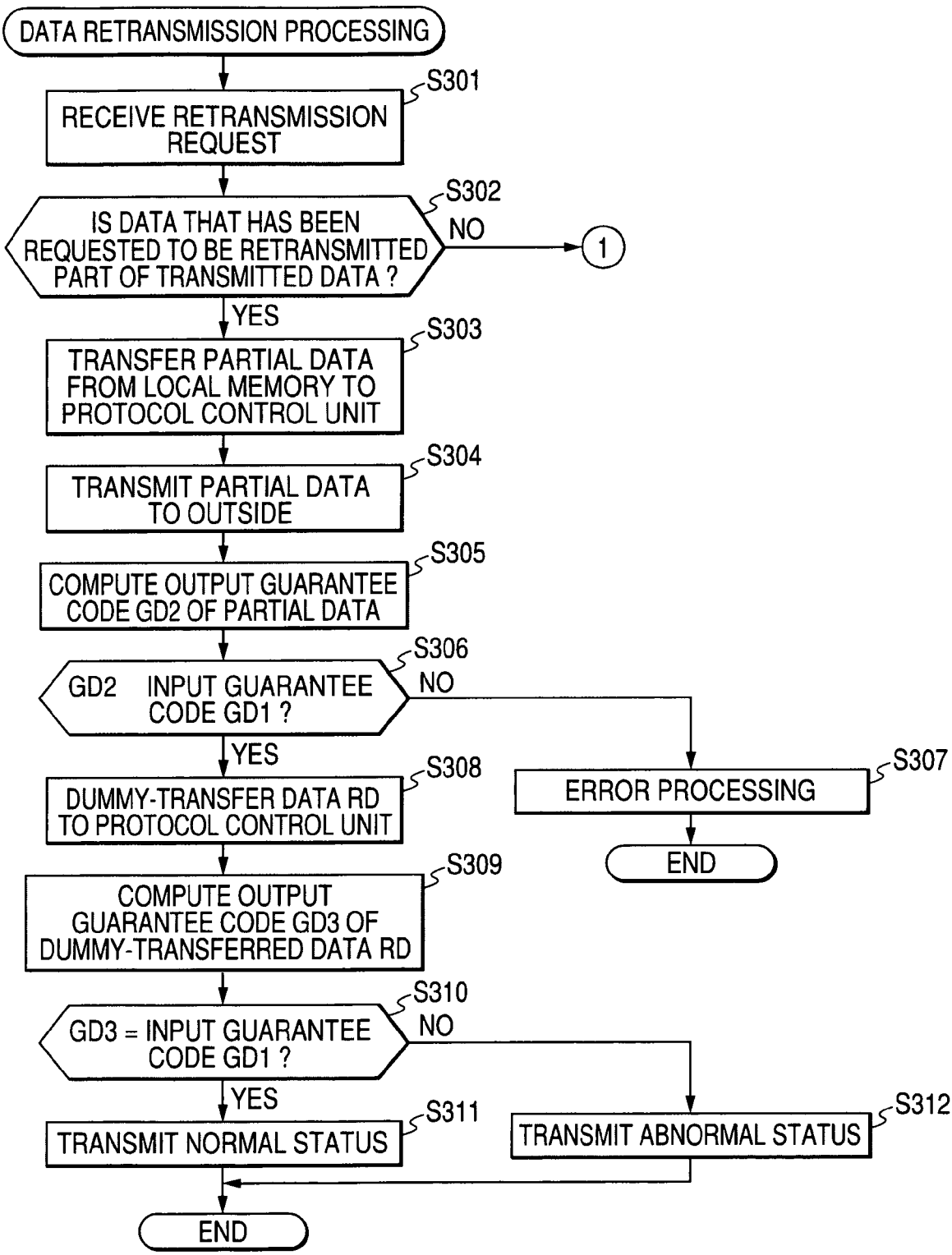
FIG. 6 is a flow chart showing the outline of processing in a case where data is retransmitted.

FIG. 5 is a flow chart showing a specific example of data transfer processing by the CHA 20. The flow chart shown in FIG. 5 corresponds to the processing shown in S7 and S8 of FIG. 4. Also, the data transfer processing in the flow chart shown in FIG. 5 is executed by the CHA 20. Specifically, the data transfer processing is executed by the cooperation of the processor 230, the port unit 210 and the data transfer control unit 220.

The data transfer control unit 220 transfers, to the local memory 240 and on the basis of an instruction from the processor 230, the data RD stored in the cache memory 50 (S21). In this case, the input guarantee code computing unit 221 computes and retains the input guarantee code GD1 in regard to the data RD stored in the local memory 240 (S22).

The data transfer control unit 220 reads, on the basis of an instruction from the processor 230, the data RD stored in the local memory 240 and transfers this data RD to the port unit 210 (S23). In this case, the output guarantee code computing unit 222 computes and retains the output guarantee code GD3 in regard to the data read from the local memory 240 (S24).

The data RD transferred to the port unit 210 is encapsulated by the protocol control unit 212 and transmitted from the transceiver 211 to the host computers 1 via the communications network CN1 (S25).

Next, the CHA 20 determine whether or not trouble has arisen during transmission of the data RD (S26). By trouble is meant loss or non-delivery of packets and data errors. In a case where no trouble has arisen, that is, in a case where all of the data RD was normally sent (S26: NO), the CHA 20 compare the input guarantee code GD1 with the output guarantee code GD3 to see whether or not they match (S27). In a case where both guarantee codes GD1 and GD3 match (S27: YES), the CHA 20 transmit the normal status to the host computers 1 (S28). In a case where both guarantee codes GD1 and GD3 do not match (S27: NO), the CHA 20 transmit the abnormal status to the host computers 1 (S29).

In a case where trouble is detected when the data RD is transmitted (S26: YES), retransmission processing is conducted (S30). A specific example of this retransmission processing will be described together with the flow chart of FIG. 6. The retransmission processing is executed by the CHA 20.

When the CHA 20 receive a retransmit request from the host computers 1 (S301), the CHA 20 determine whether or not the data requested to be retransmitted is part of the data RD (S302). The case where there is not a request to retransmit part of the data RD (S302: NO) is a case where all of the data RD is being requested. Thus, processing returns to S23 in FIG. 5 and the data RD is retransmitted.

The case where the host computers 1 request retransmission in regard to part of the data RD (S302: YES), the CHA 20 transfer the requested partial data RDp from the local memory 240 to the protocol control unit 212 of the port unit 210 (S303). The partial data RDp is encapsulated and sent from the transceiver 211 to the host computers 1 (S304). In this case, the output guarantee code computing unit 222 computes and retains the output guarantee code GD2 in regard to the partial data RDp (S305).

The CHA 20 determine whether or not the input guarantee code GD1 and the output guarantee code (partial output guarantee code) GD2 obtained in regard to the partial data RDp match (S306). Because the input guarantee code GD1 is generated when the data RD is stored in the local memory 40, the input guarantee code GD1 and the partial output guarantee code GD2 do not match in a case where data transmission inside the CHA is normal. In a case where the input guarantee code GD1 and the partial output guarantee code GD2 match (S306: NO), error processing is conducted (S307). In this error processing, the abnormal status is sent to the host computers 1.

In a case where the input guarantee code GD1 and the partial output code GD2 do not match (S306: YES), it is confirmed that data transmission inside the CHA has been conducted normally and that a portion of the data RD has been sent in S304. Next, the CHA 20 dummy-transfer all of the data RD stored in the local memory 240 to the protocol control unit 212 of the port unit 210 (S308). The protocol control unit 212 receives the dummy-transferred data RD but the data RD is nullified without being encapsulated. Due to the dummy transfer of the data RD from the local memory 240 to the port unit 210, the output guarantee code computing unit 222 again computes and retains the output guarantee code GD3 relating to the data RD (S309).

The CHA 20 determine whether or not the again-computed output guarantee code GD3 and the already-created input guarantee code GD1 match (S310). In a case where both guarantee codes GD1 and GD3 match (S310: YES), the CHA 20 determine that the partial data RDp sent in S304 is normal data and transmit the normal status, representing that normal data retransmission has been conducted, to the host computers 1 (S311). In a case where both guarantee codes GD1 and GD3 do not match (S310: NO), the CHA 20 transmit the abnormal status representing that the partial data RDp is abnormal data.

According to the present embodiment, even in a case where the host computers 1 request retransmission in regard to the partial data RDp configuring some of the data RD, data guarantee can be conducted by indirectly proving that the partial data RDp is normal data. Thus, even in an environment where data guarantee cannot be conducted in regard to a portion of sent data, as in a fibre channel protocol, data guarantee of partial data can basically be conducted. Thus, the CHA 20 developed for the fibre channel protocol can be made to accommodate an IP network and data guarantee can be conducted. Also, in the present embodiment, retransmission of partial data RDp and data guarantee can be conducted even in a configuration where a data buffer is not disposed in the port unit 210.

Second Embodiment

Figure 7:
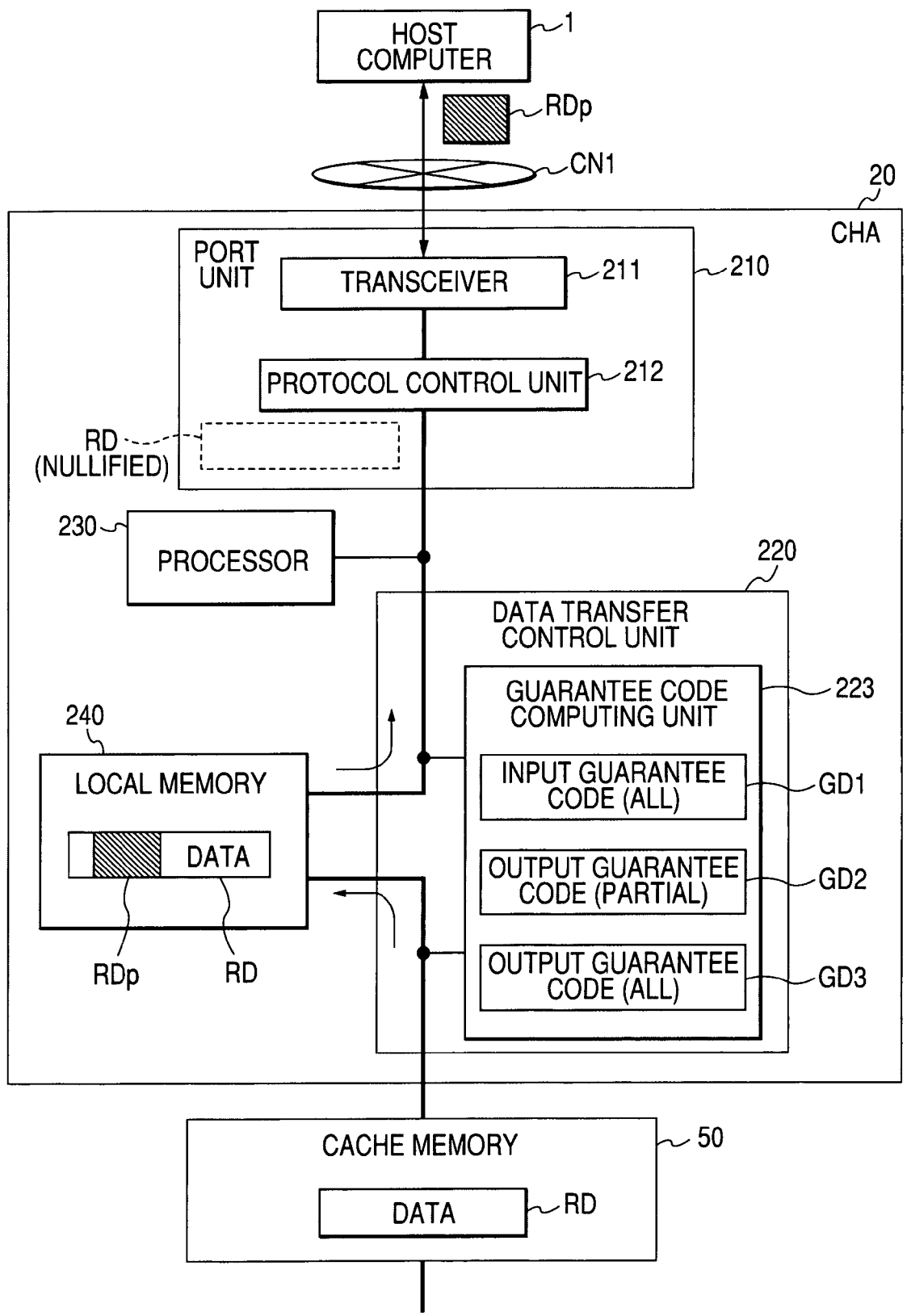
FIG. 7 is a block diagram showing the schematic configuration of the CHA pertaining to a second embodiment that is a modified example.

FIG. 7 shows the schematic configuration of a CHA 20 corresponding to a second embodiment that is a modified example of the first embodiment. The present embodiment is characterized in that both of the input guarantee code and the output guarantee codes are computed and retained by one guarantee code computing unit 223.

It should be noted that the present invention is not limited to the above-described embodiments. A person skilled in the art can make various additions or changes within the scope of the invention. For example, although a CRC was described as an example of the guarantee codes, the invention is not limited to the same and can use various guarantee codes.

What is claimed is:

1. A channel adapter that is used in a disk array device and controls data exchange with an upper-level device, the channel adapter comprising:
   an internal memory that stores data from an external memory;
   a guarantee code computing unit that computes an input guarantee code in regard to data inputted to the internal memory and computes an output guarantee code in regard to data read from the internal memory, with the guarantee codes being retainable in the guarantee code computing unit;
   a communication unit that transmits the data read from the internal memory to the upper-level device; and
   a control unit which, in a case where partial data of the data read from the internal memory unit is to be retransmitted to the upper-level device, uses the communication unit to transmit the partial data to the upper-level device, compares the input guarantee code and the output guarantee code computed by the guarantee code computing unit in regard to the data read from the internal memory unit, and determines that transmission of the data read from the internal memory unit has been conducted normally in a case where both guarantee codes are in conformity.

2. The channel adapter of claim 1, wherein the guarantee code computing unit computes the input guarantee code or the output guarantee code in regard to all of the data inputted to and read from the internal memory.

3. The channel adapter of claim 1, wherein in the case where partial data is to be retransmitted to the upper-level device, the control unit:
   (1) uses the communication unit to transmit the partial data to the upper-level device,
   (2) reads the data from the internal memory and dummy-transfers the data read from the internal memory unit to the communication unit,
   (3) uses the guarantee code computing unit to compute the output guarantee code in regard to the dummy-transferred data,
   (4) compares the recalculated output guarantee code with the input guarantee code computed when the data is inputted to the internal memory, and
   (5) notifies the upper-level device that transmission of the partial data has been conducted normally in a case where the computed output guarantee code and the input guarantee code match, and notifies the upper-level device that transmission of the partial data has not been conducted normally in a case where the computed output guarantee code and the input guarantee code do not match.

4. The channel adapter of claim 1, wherein in the case where partial data is to be retransmitted to the upper-level device, the control unit:
   (1) reads partial data from the internal memory and transfers the partial data to the communication unit, to thereby transmit the partial data to the upper-level device,
   (2) uses the guarantee code computing unit to compute a partial output guarantee code in regard to the partial data read from the internal memory,
   (3) confirms that the partial output guarantee code and the input guarantee code computed when the data is stored in the internal memory do not match,
   (4) reads the data from the internal memory and dummy-transfers the data read from the internal memory unit to the communication unit,
   (5) uses the guarantee code computing unit to compute the output guarantee code in regard to the dummy-transferred data,
   (6) compares the computed output guarantee code with the input guarantee code calculated when the data is inputted to the internal memory, and
   (7) notifies the upper-level device that transmission of the partial data has been conducted normally in a case where the computed output guarantee code and the input guarantee code match, and notifies the upper-level device that transmission of the partial data has not been conducted normally in a case where the computed output guarantee code and the input guarantee code do not match.

5. The channel adapter of claim 2 or 3, wherein the data that is dummy-transferred to the communication unit by the control unit is nullified without being sent to the upper-level device.

6. The channel adapter of claim 1, wherein data exchange between the channel adapter and the upper-level device is conducted in accordance with a Transfer Control Protocol/Internet Protocol (TCP/IP) and data exchange between the channel adapter and the external memory is conducted in accordance with a fibre channel protocol.

7. A method of controlling a channel adapter that is used in a disk array device and controls data exchange with an upper-level device, the method comprising the steps of:
   in a case where partial data of data already transmitted to the upper-level device is to be retransmitted to the upper-level device:
   reading the partial data from an internal memory and transmitting the partial data to the upper-level device;
   comparing an output guarantee code computed in regard to all data with an input guarantee code computed when the data is inputted to the internal memory; and
   determining that transmission of the partial data has been conducted normally in a case where both guarantee codes match.

8. A method of controlling a channel adapter that is used in a disk array device and controls data exchange with an upper-level device, the method comprising:
   a first step of storing data from an external memory in an internal memory;
   a second step of computing and retaining an input guarantee code in regard to all data when the data is inputted to the internal memory;
   a third step of reading the data from the internal memory;
   a fourth step of computing and retaining an output guarantee code in regard to all of the read data;
   a fifth step of transmitting the read data to the upper-level device;
   a sixth step of determining, and notifying the upper-level device, whether or not transmission has been conducted normally by comparing the input guarantee code and the output guarantee code;
   a seventh step of determining whether or not there is a retransmit request from the upper-level device in regard to partial data of the data sent to the upper-level device;
   an eighth step of reading the partial data from the internal memory and transmitting the partial data to the upper-level device in a case where there is a request to retransmit the partial data;
   a ninth step of rereading the data stored in the internal memory;
   a tenth step of again computing an output guarantee code in regard to all of the reread data; and
   an eleventh step of determining7 and notifying the upper-level device, whether or not transmission has been conducted normally by comparing the again-computed output guarantee code and the input guarantee code computed in the second step.

9. A disk array device comprising:
   a channel adapter that is connected to an upper-level device via a communications network and controls data exchange with the upper-level device;
   a storage device that stores data;
   a disk adapter that controls data exchange with the storage device; and
   a cache memory that stores data read from the storage device or data received from the upper-level device,
   wherein the channel adapter includes:
   an internal memory that stores data from the cache memory,
   an input guarantee code computing unit that computes and retains an input guarantee code in regard to the data stored in the internal memory in a case where the data is stored in the internal memory,
   an output guarantee code computing unit that computes and retains an output guarantee code in regard to the data read from the internal memory in a case where the data is read from the internal memory,
   a communication unit that transmits the data read from the internal memory to the upper-level device, and
   a control unit which, in a case where partial data of the data read from the internal memory is to be retransmitted to the upper-level device, (1) uses the communication unit to transmit partial data to the upper-level device, (2) uses the output guarantee code computing unit to compute the output guarantee code in regard to the data read from the internal memory, and (3) compares the computed output guarantee code with the input guarantee code and determines that transmission of the data read from the internal memory has been conducted normally in a case where both guarantee codes match.

10. A communication unit that is connected to an internal memory via a data transfer control unit and transmits data read from the internal memory to a upper-level device,
   wherein after the communication unit reads partial data of data stored in the internal memory and transmits the partial data to the upper-level device, the communication unit reads all of the data from the internal memory and nullifies the read data without transmitting it to the upper-level device.

* * * * *

UNITED STATES PATENT AND TRADEMARK OFFICE
CERTIFICATE OF CORRECTION

| | | |
|---|---|---|
| PATENT NO. | : 7,073,092 B2 | Page 1 of 1 |
| APPLICATION NO. | : 10/769927 | |
| DATED | : July 4, 2006 | |
| INVENTOR(S) | : H. Okamoto et al. | |

It is certified that error appears in the above-identified patent and that said Letters Patent is hereby corrected as shown below:

PLEASE INSERT ON THE TITLE PAGE

--     (30)    Foreign Application Priority Data

Nov. 25, 2003   (JP).......................2003-393647 --

Signed and Sealed this

Twenty-sixth Day of December, 2006

JON W. DUDAS
*Director of the United States Patent and Trademark Office*